United States Patent [19]

Philippi et al.

[11] 3,801,781
[45] Apr. 2, 1974

[54] DISPLACEMENT MEASURING APPARATUS

[76] Inventors: Marvin A. Philippi, 8603 Roger Ct., Pico Rivera, Calif. 90660; Harry W. Whitcomb, 732 Hillcrest St., El Segundo, Calif. 90245

[22] Filed: Nov. 9, 1972

[21] Appl. No.: 305,122

[52] U.S. Cl. .......... 250/231 R, 250/231 P, 350/266
[51] Int. Cl. ..................... G01d 5/34, G02b 9/14
[58] Field of Search ............ 267/2; 250/231, 231 P; 350/266

[56] References Cited
UNITED STATES PATENTS
| | | | |
|---|---|---|---|
| 1,925,355 | 9/1933 | Whitson | 350/269 X |
| 2,147,711 | 2/1939 | Martin | 250/231 R |
| 3,447,862 | 6/1969 | Elpern | 250/231 R |
| 3,590,261 | 6/1971 | Snook | 250/231 P |

*Primary Examiner*—James W. Lawrence
*Assistant Examiner*—T. N. Grigsby
*Attorney, Agent, or Firm*—William W. Haefliger

[57] ABSTRACT

Displacement measurement apparatus comprises:
a. a cell operable in response to reception of light flux to generate electrical current,
b. a source of luminous flux directed toward the cell,
c. a shutter in the path of the light flux, at least one of the shutter, cell and source being relatively movable to control the amount of light flux incident on the cell, and
d. means responsive to said cell generated current to indicate the extent of said relative movement.

7 Claims, 5 Drawing Figures

PATENTED APR 2 1974 3,801,781
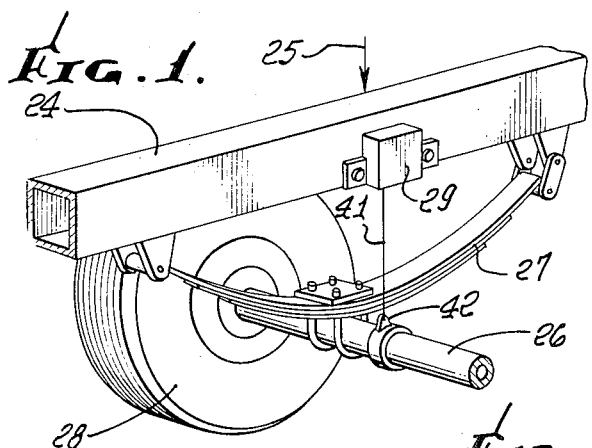
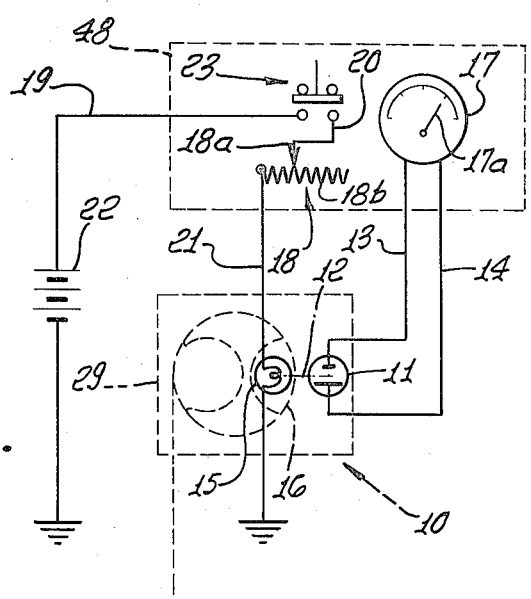
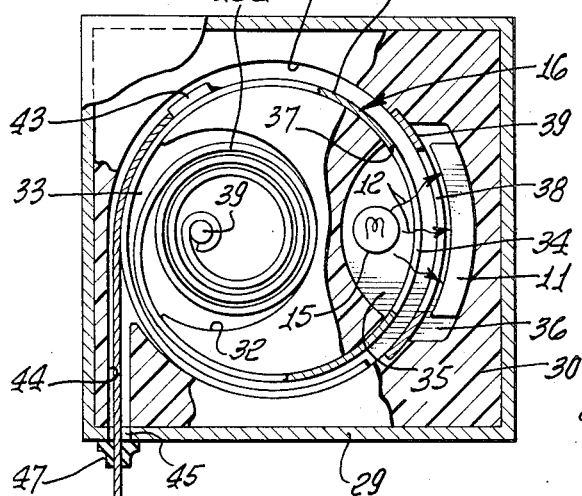
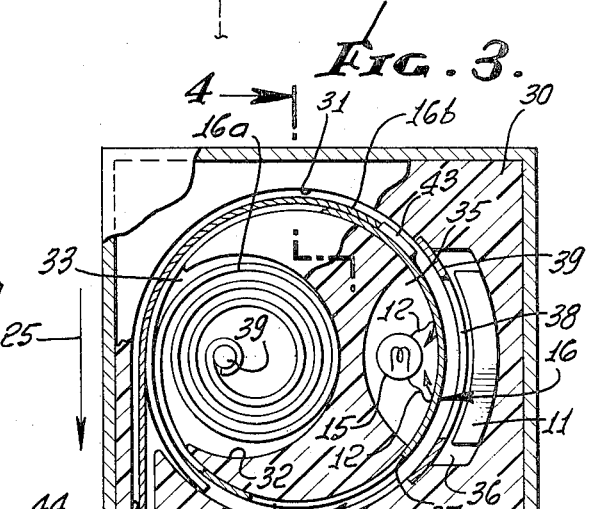
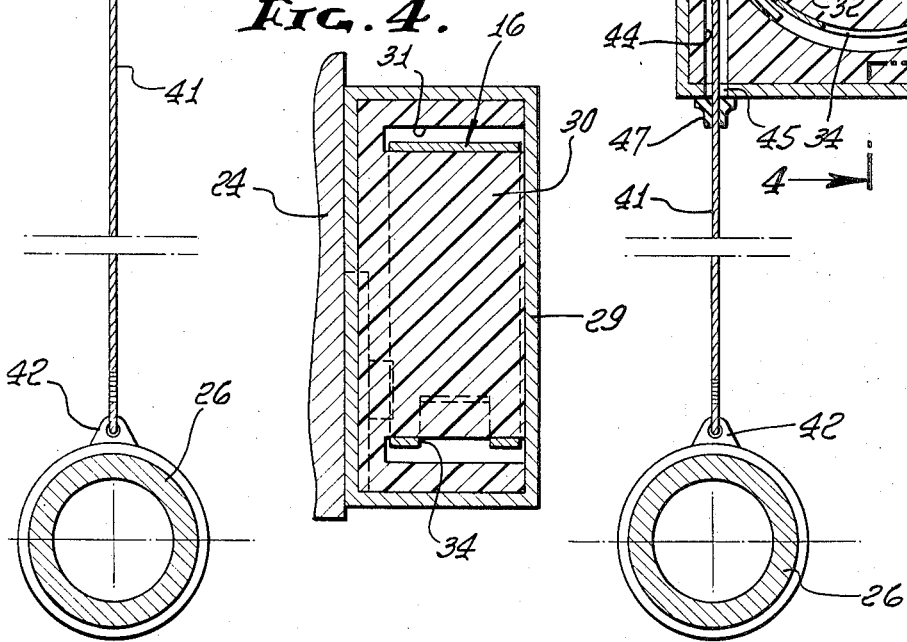

DISPLACEMENT MEASURING APPARATUS

BACKGROUND OF THE INVENTION

This invention relates generally to displacement transducers, and more particularly concerns displacement measurement apparatus of very simple, rugged design, particularly well adapted to displacement measurement in industrial applications, as for example on load carrying vehicles.

With reference to trucks and similar vehicles, there is a need for a very simple, rugged apparatus for indicating applied loads, and which will not malfunction in use. While various types of electronic, bridge-balancing and ultrasonic devices have been constructed for such purposes, none of which we are aware embody the unusually advantageous features of simplicity of construction, mode of operation and results which characterized the present invention. For example, the use of bridges and photocells is disadvantageous from the standpoints of circuit complexity, high costs and lack of rugged design to withstand road conditions.

SUMMARY OF THE INVENTION

It is a major object of the invention to provide a solution to the above problems as well as additional benefits as will appear. Basically, the invention is embodied in displacement measurement apparatus which comprises a cell operable in response to incidence of light flux to generate electrical current; a source of such flux directed to be incident on the cell; a shutter movable in the flux path to control the amount of flux incident on the cell; and means responsive to such generated current to indicate the extent of shutter movement. As will appear, the shutter may advantageously include a resiliently coiled section defining a return spring for urging the shutter in a retraction direction; and means such as a flexible line may be operatively connected with the shutter for urging the latter in an advance direction, all for the purpose of effecting variation in flux incidence on the cell, as a function of shutter displacement in opposite directions.

It is a further object of the invention to provide for incorporation of the displacement measurement apparatus onto a vehicle, as by carriage of the shutter so as to be moved as described in response to vehicle frame movement relative to wheel and axle structure. For example, the resiliently coiled section of the shutter may be operatively carried by the freame and an extended section of the shutter may be operatively connected to the axle, as by means of the described flexible line. In this regard, adjustable resistance may be electrically connected with the light source for calibrating the indicating means in relation to vehicle frame displacement toward the axle, as in response to increased loading.

It is a still further object of the invention to provide a novel and advantageous vehicle mountable body or housing for the shutter, and defining an arcuate guide slot and a recess intersecting the slot, the coiled section received in the recess and the shutter extended section received in the slot to advance and retract as will be described. The source of light flux as well as the flux responsive cell may both be carried by the body so that an integrated unit is formed for ready attachment to a vehicle frame.

These and other objects and advantages of the invention, as well as the details of an illustrative embodiment, will be more fully understood from the following description and drawings, in which:

DRAWING DESCRIPTION

FIG. 1 is a perspective showing of an application of the invention;

FIG. 2 is an enlarged vertical section showing the FIG. 1 device;

FIG. 3 is a view like FIG. 2 but with the vehicle loading increased to displace the frame downwardly toward the axle;

FIG. 4 is a section on lines 4—4 of FIG. 3; and

FIG. 5 is a circuit diagram.

DETAILED DESCRIPTION

Referring first to FIG. 5, displacement measuring apparatus 10 comprises of a cell 11, as for example a solar cell, operable in response to reception of incident light flux 12 to generate electrical current as may flow in leads 13 and 14. A source of the luminous flux, as for example a light bulb 15, directs such light flux toward the cell and past a shutter 16. The latter is movable in the path of the light flux to control the amount of light flux incident on the cell so that the amount of current generated is a function of shutter movement. Lastly, means such as a meter 17 is provided to be responsive to current in leads 13 and 14 to indicate the extent of shutter movement. Accordingly, no signal amplifier is needed, and only very simple components are required. If desired, a rheostat or potentiometer may be provided at 18 in series with the leads 19, 20 and 21 between the light bulb and a bulb energizing source of current such as a battery 22. Upon closing of switch 23 and adjustment of wiper 18a along the variable resistance 18b, the meter 17 may be calibrated to produce a selected deflection of the indicator arm 17a for a given displacement of the shutter 16. As will be seen, shutter displacement may correspond to an amount of imposed vehicle loading.

Referring to FIG. 1, a vehicle frame 24 is adapted to receive variable loading as indicated by arrow 25. The frame is supported by an axle 26 via spring structure 27, a vehicle wheel being designated at 28. The vehicle body or frame is movable relatively downwardly toward the axle as the imposed loading increases. An instrument case 29 containing the shutter 16 may be attached to the frame so that the shutter moves relative to the path of the light flux in response to vehicle body or frame downward movement, as referred to.

Referring to FIGS. 2—4, the case 29 contains a housing or body 30 which defines an enclosed arcuate guide slot 31 (which may be generally circular or loop-shaped) and an enclosed recess 32 generally tangentially intersecting the slot, as for example at 33. Such a body may advantageously consist of molded plastic material. The shutter 16 may then advantageously have a resiliently closely coiled section 16a located in the recess 32 and additional (more loosely coiled extent 16b) located and movable lengthwise in the slot 31.

The shutter section 16b typically contains a light flux passing window 34 which controls the amount of light flux passing to the cell 11 as a function of shutter endwise sliding movement in the slot 31. Note that the bulb 15 may be located in a recess 35 in the body 30 at one side of window 34, whereas the cell 11 may be located in another recess 36 in the body 30, and at the opposite side of window 34. As window edge 37 progresses clockwise between the bulb and cell, less and less light flux is received by the cell. An additional of fixed window 38 may be defined by a metal strip 39 between the shutter and the curved cell, as shown, to protect the cell against inadvertent contact by the movable shutter. The aperture defined by window 38 to light flux is progressively decreased as shutter window edge 37 progresses clockwise, as described.

It will be noted that the resiliently coiled section 16a of the shutter 16 defines a return spring for urging the shutter in a retraction direction. Thus, as a variable load is applied indicated by arrow 25 the instrument case 29 moves downwardly toward the axle, as represented in FIG. 3, the shutter window 34 is moved clockwise in the slot 31 as shutter material is pulled or retracted into the recess 32 to increasingly coil into the section 16a. The latter is anchored to post 39.

Means is operatively connected with the shutter for urging it in an advancement direction to vary the light flux incident on the cell 11. Such means may advantageously take the form of a flexible line, as at 41, connected at 42 with the axle, and at 43 with the shutter extent 16b. Small openings 44 and 45 in the body and case pass that line between the interior and exterior of the body and case, and a dust seal 47 may be employed to closely fit the line to prevent dust and dirt entry into the case and body interior.

Referring back to FIG. 4, the components in box 48 may be located anywhere in a vehicle, as for example in a cab or passenger compartment, to allow the driver to obtain a load reading on meter 17 by closing switch 23.

When required, meter readings of measurements at more than one point can be accomplished by connecting additional displacement measuring devices in series with lines 13 and 14. Measurements may be read individually by incorporating a selector switch, not shown.

We claim

1. In displacement measurement apparatus, the combination comprising
 a. a cell operable in response to reception of light flux to generate electrical current,
 b. a source of luminous flux directed toward the cell,
 c. a shutter in the path of the light flux, the shutter being relatively movable to control the amount of light flux incident on the cell, the shutter including a coiled flat section and a lengthwise elongated section, the coiled section defining a return spring for urging the elongated section lengthwise in a retraction direction to vary the light flux incident on the cell, said coiled flat section remaining out of said flux path, the shutter being supported for said movement, and
 d. means responsive to said cell generated current to indicate the extent of said relative movement.

2. The combination of claim 1 including means operatively connected with the shutter for urging said elongated section of the shutter lengthwise in an advance direction to vary the light flux incident on the cell.

3. The combination of claim 1 including adjustable resistance electrically connected with the light source for calibrating the indicating means.

4. The combination of claim 1 wherein the shutter contains a light flux passing window, and means defining a fixed window in light flux passing registration with the shutter window and relative to which the shutter window is movable.

5. In displacement apparatus, the combination comprising
 a. a cell operable in response to reception of light flux to generate electrical current,
 b. a source of luminous flux directed toward the cell,
 c. a shutter in the path of the light flux, the shutter being relatively movable to control the amount of light flux incident on the cell, the shutter including a resiliently coiled section defining a return spring for urging the shutter in a retraction direction to vary the light flux incident on the cell,
 d. means responsive to said cell generated current to indicate the extent of shutter relative movement, and
 e. a housing defining an arcuate guide slot and a recess intersecting said slot, the shutter coiled section located in said recess, and the shutter including additional extent movable lengthwise in said recess.

6. The combination of claim 5 wherein the shutter defines movable window passing light flux in the housing, the housing also carrying the cell and light flux source at opposite sides of said window.

7. The combination of claim 6 wherein said housing is defined by a single body of molded plastic material.

* * * * *